(12) United States Patent
Terada et al.

(10) Patent No.: US 9,156,504 B2
(45) Date of Patent: Oct. 13, 2015

(54) VEHICLE UNDERBODY STRUCTURE FOR VEHICLE

(71) Applicant: MAZDA MOTOR CORPORATION, Hiroshima (JP)

(72) Inventors: Sakayu Terada, Hiroshima (JP); Takashi Yoshimura, Hiroshima (JP); Kazuya Chikamori, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/345,924

(22) PCT Filed: Dec. 4, 2012

(86) PCT No.: PCT/JP2012/007758
§ 371 (c)(1),
(2) Date: Mar. 19, 2014

(87) PCT Pub. No.: WO2013/094133
PCT Pub. Date: Jun. 27, 2013

(65) Prior Publication Data
US 2015/0217810 A1  Aug. 6, 2015

(30) Foreign Application Priority Data

Dec. 20, 2011 (JP) .................................. 2011-277784

(51) Int. Cl.
*B62D 21/11* (2006.01)
*B62D 25/20* (2006.01)
(Continued)

(52) U.S. Cl.
CPC .............. *B62D 25/2027* (2013.01); *B60G 3/20* (2013.01); *B60G 7/02* (2013.01); *B60K 15/063* (2013.01); *B60G 2204/143* (2013.01); *B60K 2015/0634* (2013.01)

(58) Field of Classification Search
CPC .... B62D 25/2027; B62D 25/08; B62D 21/11; B60G 7/02; B60G 2204/143; B60G 2204/43
USPC ........................................... 280/781, 124.153
See application file for complete search history.

(56) References Cited

U.S. PATENT DOCUMENTS 4,557,519 A * 12/1985 Matsuura ..................... 296/204
8,286,980 B2 * 10/2012 Onda et al. ............. 280/124.128

FOREIGN PATENT DOCUMENTS

| JP | 62-043875 A | 3/1987 |
| JP | 62-043875 U | 3/1987 |

(Continued)

OTHER PUBLICATIONS

International Search Report; PCT/JP2012/007758; Mar. 12, 2013.

*Primary Examiner* — Keith Frisby
(74) *Attorney, Agent, or Firm* — Studebaker & Brackett PC

(57) ABSTRACT

A rear frame (11) includes: a first inclined part (11A) having a rearward rising incline, a trailing arm attachment part (11B) extending horizontally at the rear side of the first inclined part (11A), and a second inclined part (11C) having a rearward rising incline at the rear side of the trailing arm attachment part (11B). An upward-convex first protrusion (41), in which at least a portion of the front end section of a trailing arm (21) is accommodated, is formed in the trailing arm attachment part (11B), a downward-convex second protrusion (42) is formed in the front section of the first inclined part (11A), and the first protrusion (41) and the second protrusion (42) are disposed so as to mutually overlap in the vehicle width direction.

12 Claims, 11 Drawing Sheets

(51) Int. Cl.
*B60G 3/20* (2006.01)
*B60K 15/063* (2006.01)
*B60G 7/02* (2006.01)

(56) References Cited

FOREIGN PATENT DOCUMENTS

| JP | 03-013205 | A | | 2/1991 | |
| --- | --- | --- | --- | --- | --- |
| JP | 03-013205 | U | | 2/1991 | |
| JP | 04317809 | A | * | 11/1992 | ............... B60G 7/02 |
| JP | 07-164845 | A | | 6/1995 | |
| JP | 2003-054233 | A | | 2/2003 | |
| JP | 2004114789 | A | * | 4/2004 | ............. B62D 25/20 |
| JP | 2004-224087 | A | | 8/2004 | |
| JP | 2006069475 | A | * | 3/2006 | |
| JP | 2007022294 | A | * | 2/2007 | |
| JP | 2007-290665 | A | | 11/2007 | |
| JP | 2008155706 | A | * | 7/2008 | |
| JP | 2010132026 | A | * | 6/2010 | |

* cited by examiner

VEHICLE UNDERBODY STRUCTURE FOR VEHICLE

TECHNICAL FIELD

This invention relates to a vehicle underbody structure for a vehicle, and more particularly, to a vehicle underbody structure for a vehicle, including: a floor panel; a left and right pair of floor frames which are joined to the lower surface of the floor panel and extend in the front/rear direction of the vehicle body; a left and right pair of rear frames which are joined to the lower surface of the floor panel at the rear side of the floor frames and extend in the front/rear direction of the vehicle body; and a rear wheel suspension having a trailing arm.

BACKGROUND ART

In general, a trailing arm attachment part which attaches a trailing arm of a rear wheel suspension to a vehicle body is required to have high rigidity from the viewpoint of steering stability, and the like. Means conventionally used to achieve high rigidity in a trailing arm attachment part includes: a configuration using a reinforcing member in the attachment part, a configuration which increases the plate thickness of the attachment part, or a configuration which forms the attachment part from a high-strength member, and so on. However, each of these approaches inhibits weight reduction, as well as leading to increased costs, and consequently there has been scope for improvement from the viewpoint of weight reduction and cost.

More specifically, the trailing arm attachment part is subject to the following requirements: (a) the part must have high rigidity from the viewpoint of steering stability, and the like; (b) the part must be positioned higher than the wheel center, from the viewpoint of steering stability, and the like; and (c) the part must be horizontal from the viewpoint of the ease of assembly.

Effective means for achieving (b) and (c) above is to provide a horizontal portion in the kick-up part of the rear frame. However, in this case, an inclined part having a relatively steep angle of incline is formed in the rear frame described above. Furthermore, in the event of a front collision, the load of the collision is liable to be concentrated in the inclined part, and therefore it is necessary to improve rigidity in the vicinity of the inclined part and to transmit the collision load in a smooth fashion.

Patent Document 1 discloses providing a kick-up part having a rear rising incline which links a side sill rear part and a rear frame front part in a low-front and high-rear fashion, and providing an attachment part for attaching the trailing arm of a rear wheel suspension on the kick-up part. However, in the prior art structure disclosed in Patent Document 1, since an opening section passing through the front linking end of the trailing arm is formed with a large opening in the kick-up part, then the rigidity becomes lower although the weight of the components increases, and there has been scope for weight reduction.

Patent Document 1: Japanese Patent Application Publication No. 2007-290665

SUMMARY OF THE INVENTION

Therefore, it is an object of this invention to provide a vehicle underbody structure for a vehicle which can both maintain the height of the trailing arm attachment part, in other words, ensure good steering stability, and ensure smooth transmission of load in the event of a front collision by ensuring and improving the rigidity in the trailing arm attachment part from the first inclined part, while having a light-weight structure.

The vehicle underbody structure for a vehicle according to this invention is a vehicle underbody structure for a vehicle, including: a floor panel; a left and right pair of floor frames which are joined to a lower surface of the floor panel and extend in a front/rear direction of the vehicle body; a left and right pair of rear frames which are joined to the lower surface of the floor panel at the rear side of the floor frames and extend in the front/rear direction of the vehicle body; and a rear wheel suspension having a trailing arm, wherein the rear frames each include: a first inclined part having a rearward rising incline; a trailing arm attachment part extending horizontally at the rear side of the first inclined part; and a second inclined part having a rearward rising incline at the rear side of the trailing arm attachment part, an upward-convex first protrusion, in which at least a portion of a front end section of the trailing arm is accommodated, is formed in the trailing arm attachment part, a downward-convex second protrusion is formed in a front section of the first inclined part, and the first protrusion and the second protrusion are disposed so as to mutually overlap in a vehicle width direction.

According to this invention, a beneficial effect is obtained in that it is possible both to maintain the height of the trailing arm attachment part, in other words, ensure good steering stability, and ensure smooth transmission of load in the event of a front collision by ensuring and improving the rigidity in the trailing arm attachment part from the first inclined part, while having a light-weight structure.

The aforementioned and other objects, characteristics and advantages of the present invention will become apparent from the following detailed description and the accompanying drawings.

MODE FOR CARRYING OUT THE INVENTION

Figure 1:
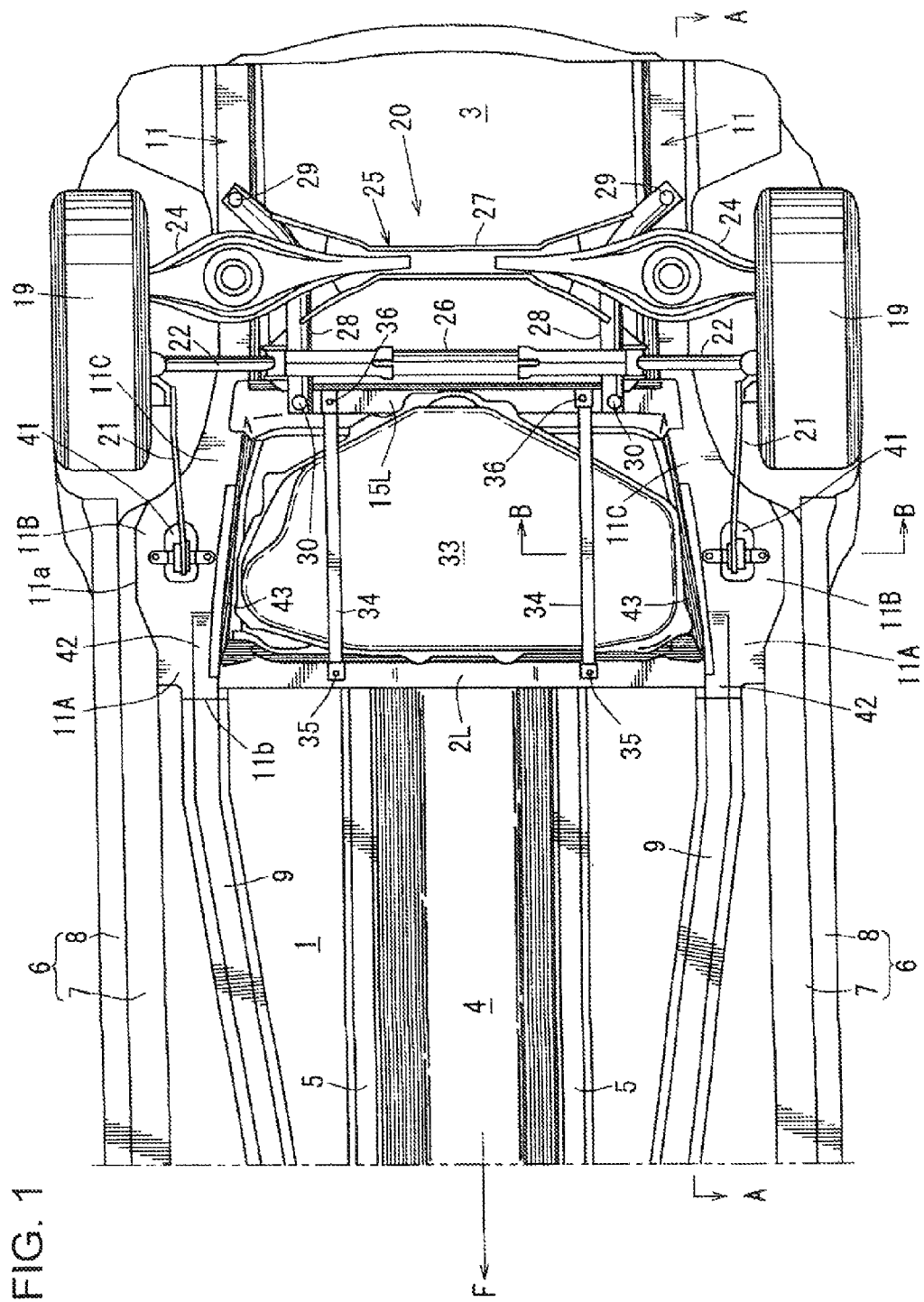
FIG. 1 is a bottom surface diagram showing a vehicle underbody structure for a vehicle according to the present invention.

In one embodiment of the invention, the object of making it possible both to maintain the height of the trailing arm attachment part, in other words, ensure good steering stability, and ensure smooth transmission of load in the event of a front collision by ensuring and improving the rigidity in the trailing arm attachment part from the first inclined part, while having a light-weight structure, is achieved by a vehicle underbody structure for a vehicle, including: a floor panel; a left and right pair of floor frames which are joined to a lower surface of the floor panel and extend in a front/rear direction of the vehicle body; a left and right pair of rear frames which are joined to the lower surface of the floor panel at the rear side of the floor frames and extend in the front/rear direction of the vehicle body; and a rear wheel suspension having a trailing arm, wherein the rear frames each include: a first inclined part having a rearward rising incline; a trailing arm attachment part extending horizontally at the rear side of the first inclined part; and a second inclined part having a rearward rising incline at the rear side of the trailing arm attachment part, an upward-convex first protrusion, in which at least a portion of a front end section of the trailing arm is accommodated, is formed in the trailing arm attachment part, a downward-convex second protrusion is formed in a front section of the first inclined part, and the first protrusion and the second protrusion are disposed so as to mutually overlap in the vehicle width direction.

One embodiment of this invention is described in detail on the basis of the following drawings.

This invention is not limited only to the configuration of the embodiment described below.

In the drawings, the arrow F indicates the front of the vehicle, the arrow R indicates the rear of the vehicle, the arrow IN indicates an inward vehicle width direction and the arrow OUT indicates an outward vehicle width direction.

Figure 2:
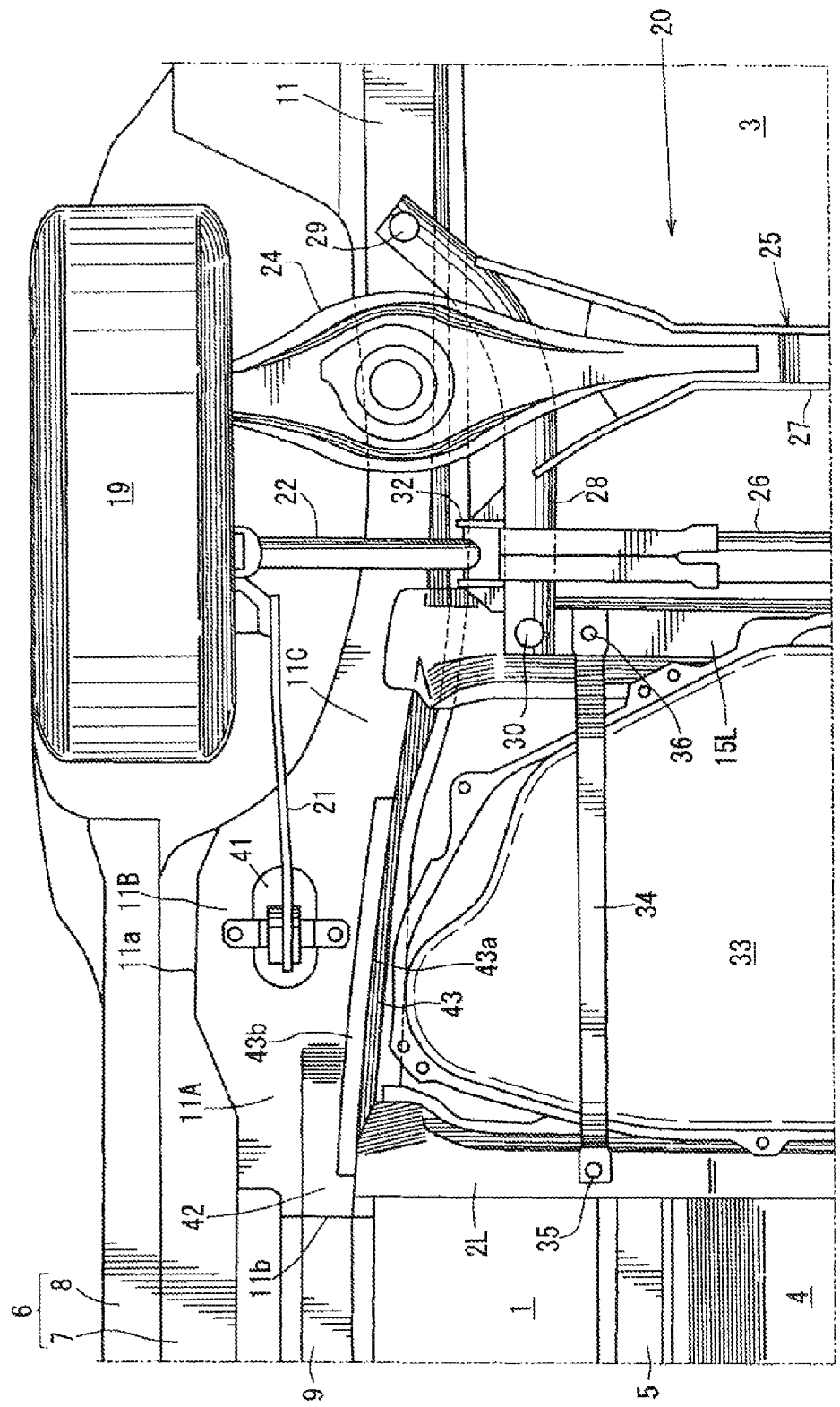
FIG. 2 is a bottom surface diagram showing an enlarged view of the principal part of FIG. 1.
Figure 3:
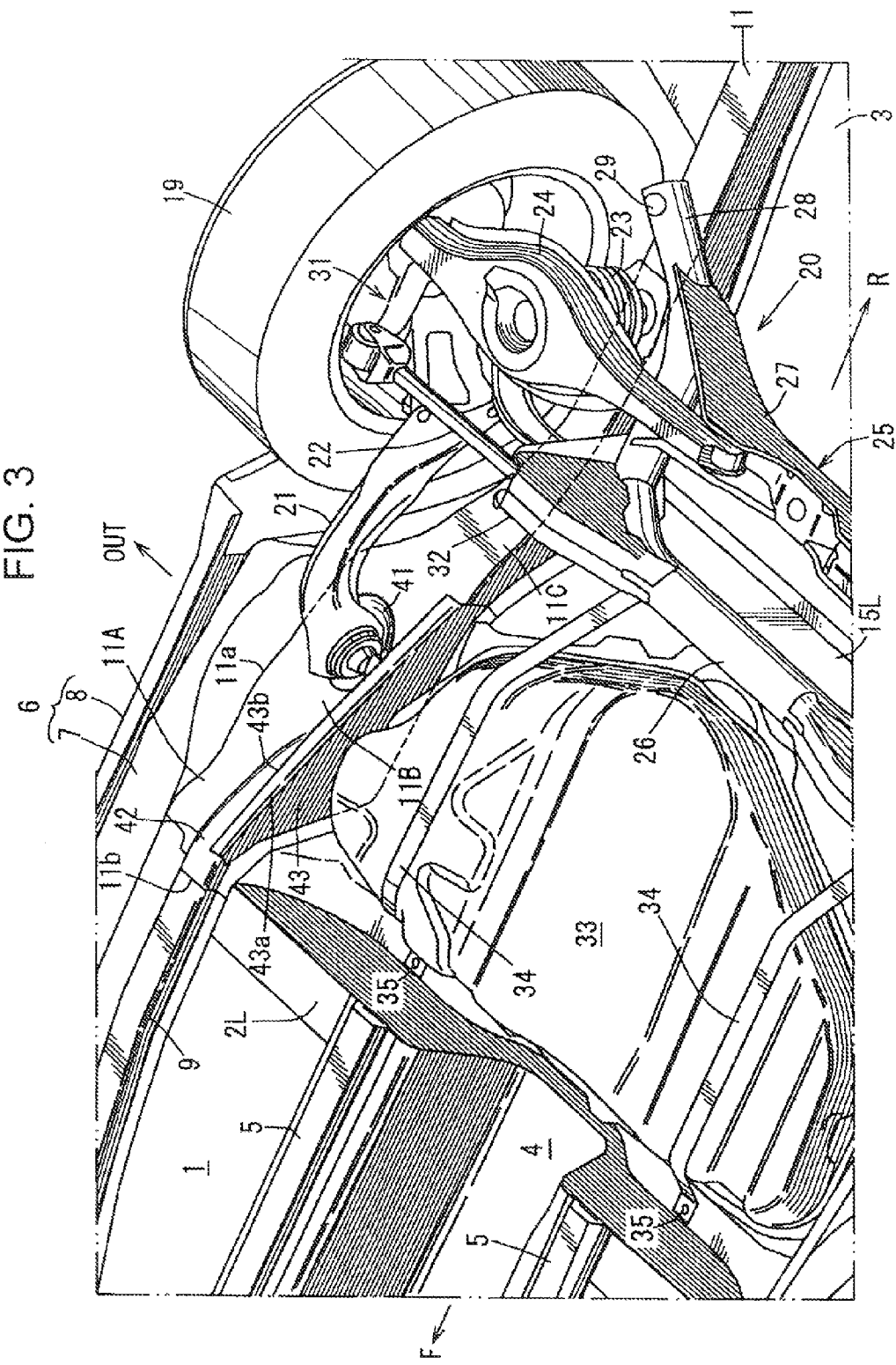
FIG. 3 is a bottom surface perspective diagram showing a vehicle underbody structure.

The drawings depict a vehicle underbody structure for a vehicle. FIG. 1 is a bottom surface diagram showing a vehicle underbody structure, FIG. 2 is a bottom surface diagram showing an enlarged view of the principal part of FIG. 1, FIG. 3 is a perspective diagram of FIG. 2, in other words, a perspective diagram showing the vehicle underbody structure as viewed from the bottom surface, and FIG. 4 is a side face diagram showing a vehicle underbody structure.

Figure 4:
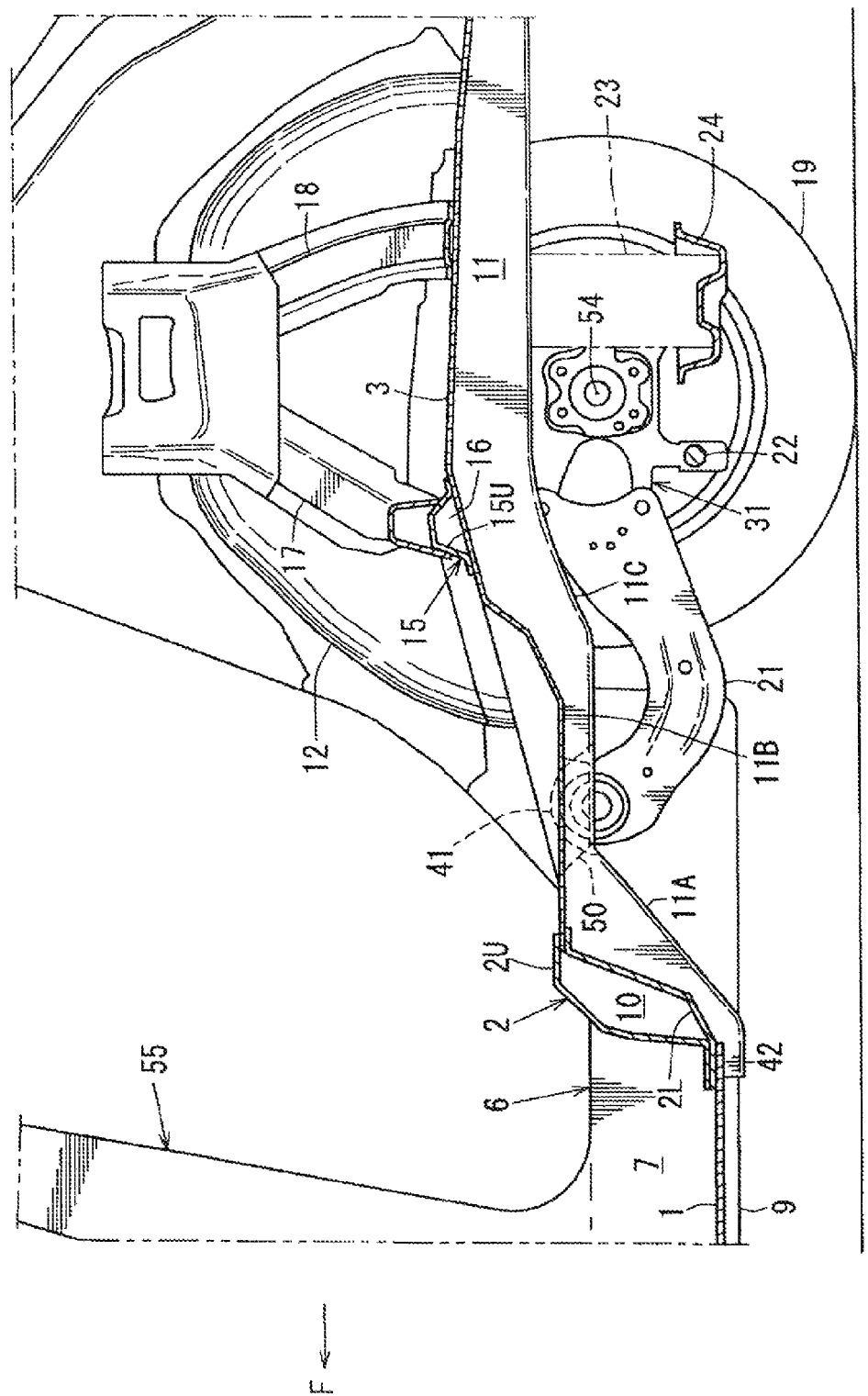
FIG. 4 is a side face diagram showing a vehicle underbody structure.

In FIG. 1 and FIG. 4, a floor panel 1 forming the bottom surface of the vehicle cabin is provided, and a rear floor 3 is formed in continuous fashion on the rear part of the floor panel 1, via a No. 3 cross member 2 (floor cross member). Here, the rear floor 3 is arranged at a position higher than the floor panel 1.

A tunnel part 4 which projects inside the vehicle cabin and extends in the front/rear direction of the vehicle is formed in an integrated fashion in a substantially central portion of the floor panel 1 in the vehicle width direction.

Tunnel members 5, which have a hat-shaped cross-section, are provided in lower end sections of the tunnel part 4. A left/right pair of tunnel members 5 extend in the front/rear direction of the vehicle. The rigidity of the tunnel part 4 and the floor panel 1 is improved by these tunnel members 5.

Moreover, side sills 6 extending in the front/rear direction of the vehicle are joined and fixed to both the left and right side sections of the floor panel 1 described above. The side sills 6 are vehicle body strengthening members having a closed side sill cross-section extending in the front/rear direction of the vehicle, in which a side sill inner part 7 and a side sill outer part 8 are joined and fixed together. The rigidity of the side parts of the vehicle body is ensured by the side sills 6.

Moreover, a left/right pair of floor frames 9 which are joined and fixed to the lower surface of the floor panel 1 and which extend in the front/rear direction of the vehicle body are provided between the tunnel members 5 and the side sills 6. This floor frames 9 are each formed with a hat-shaped cross-section, whereby a closed cross-section extending the front/rear direction of the vehicle body is formed between the floor frames 9 and the lower surface of the floor panel 1, thereby ensuring the rigidity of the floor and the rigidity of the vehicle underbody.

As shown in FIG. 4, the No. 3 cross member 2 described above is provided on an upper surface of a rear end section of the floor panel 1 described above.

This No. 3 cross member 2 is a vehicle body strengthening member having a cross member upper part 2U and a cross member lower part 2L, and is provided with a cross member closed cross-section 10 extending in the vehicle width direction. The cross member upper part 2U and the cross member lower part 2L are respectively provided with a front side joint flange, a kick-up part extending in the up/down direction, and a rear side joint flange.

As shown in FIG. 4, the floor panel 1 described above is fixed continuously to the lower surface of the joint section between the front side joint flanges of the cross member upper part 2U and the cross member lower part 2L. The front end section of the rear floor 3 is fixed in a sandwiched fashion between the rear side joint flange of the cross member upper part 2U and the rear side joint flange of the cross member lower part 2L.

As shown in FIG. 1 and FIG. 4, rear side frames 11 are provided as a left/right pair of rear frames extending in the front/rear direction of the vehicle body, which are joined to the lower surface of the rear floor 3.

These rear side frames 11 are vehicle body strengthening members which pass through the inner side of the wheel house 12 and extend in the front/rear direction of the vehicle body, on both sides of the lower surface of the rear floor 3. As shown in FIG. 1, a front side part 11a of each rear side frame 11 is joined to the side sill inner part 7, and a front end part 11b of each rear side frame 11 is joined to a rear side of the floor frame 9.

Furthermore, as shown in the bottom surface diagram in FIG. 1, the floor frame 9 on the lower surface of the floor panel 1 and the rear side frame 11 on the lower surface of the rear floor 3 are disposed so as to be continuous in the front/rear direction of the vehicle.

Figure 5:
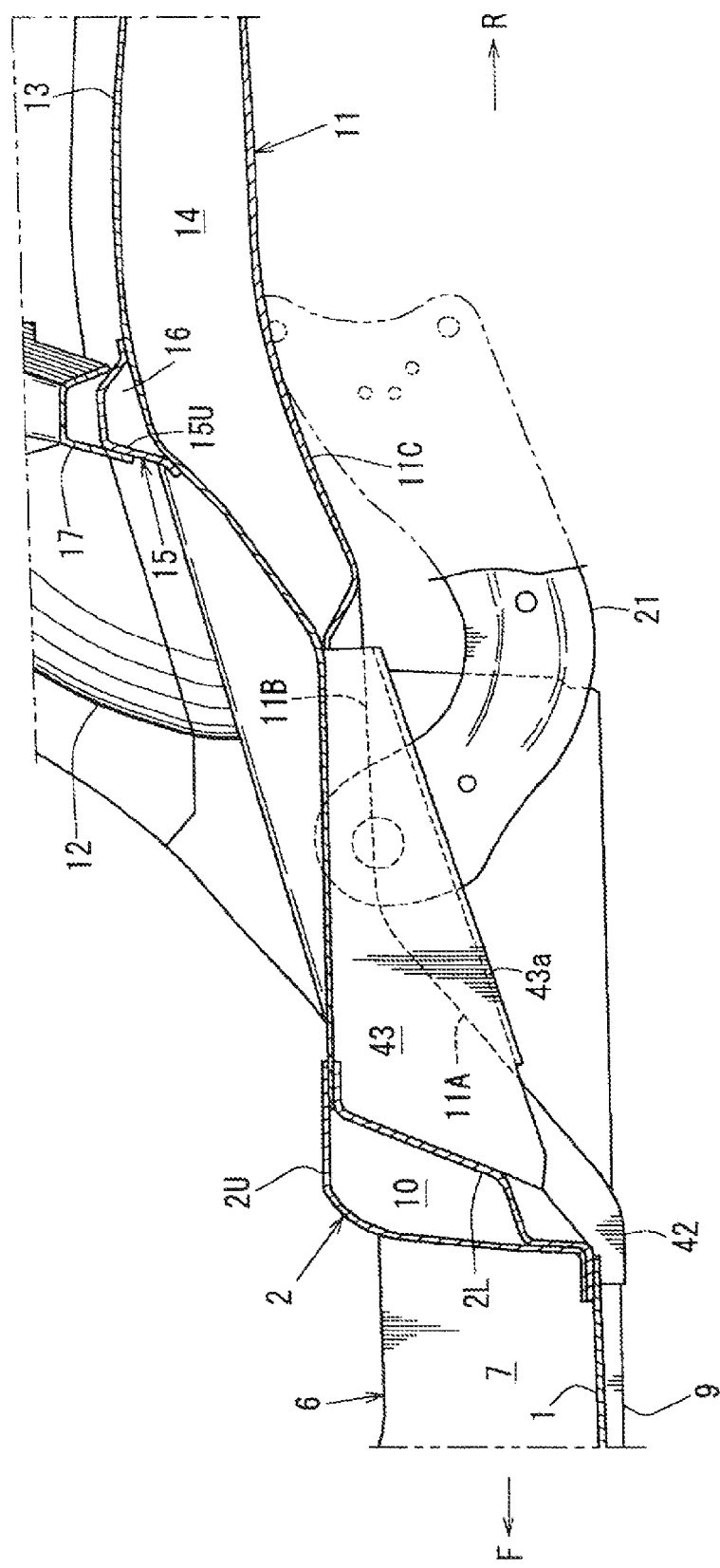
FIG. 5 is a view of the principal part along line A-A in FIG. 1.
Figure 6:
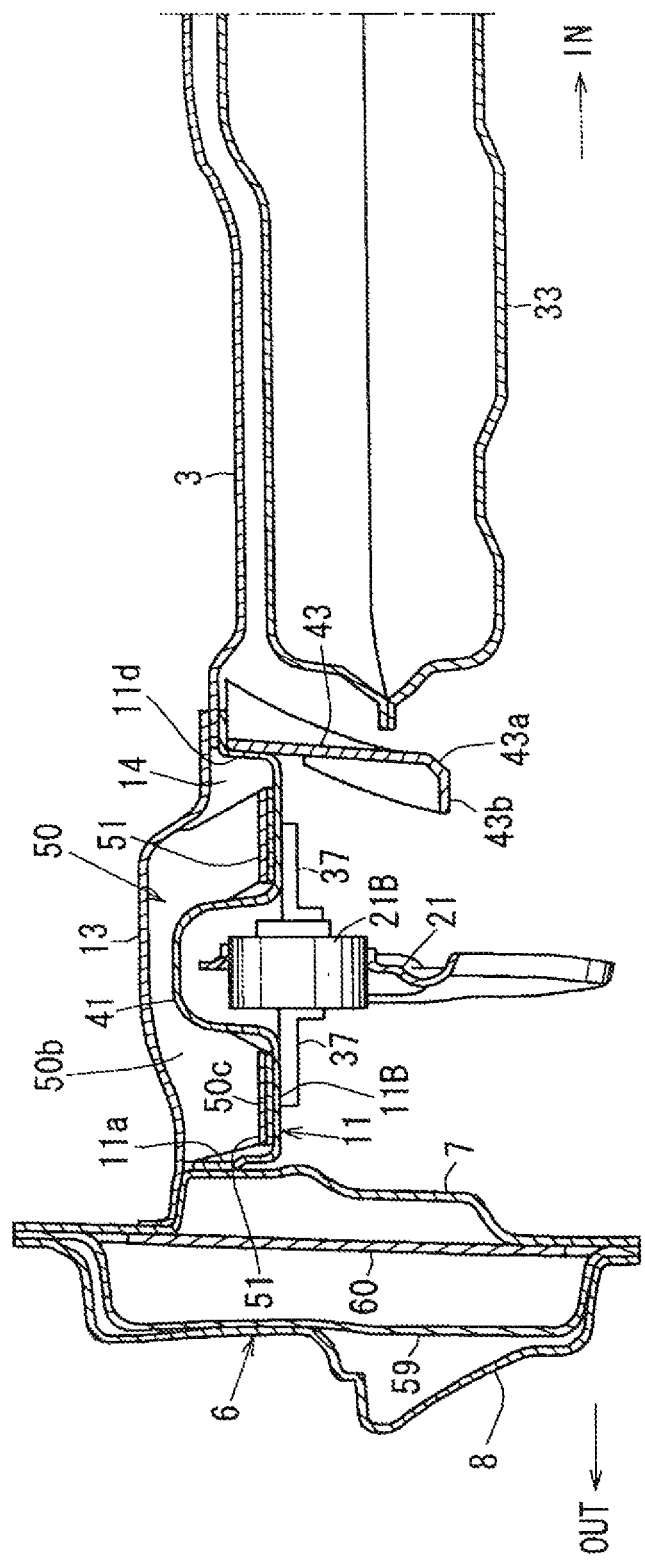
FIG. 6 is a view of the principal part along line B-B in FIG. 1.

FIG. 5 is a view of the principal part along line A-A in FIG. 1 (side face diagram), and FIG. 6 is a view of the principal part along line B-B in FIG. 1 (front surface diagram). As shown in FIG. 6, on either side of the rear floor 3 (only the right-hand side of the vehicle is shown in FIG. 6), a rear floor side part (which is the same as the rear side frame upper part) 13 is provided so as to oppose the rear side frame 11 in the up/down direction.

The rear floor side part 13 is a member which extends in the front/rear direction of the vehicle body, similarly to the rear side frame 11, and as shown in FIG. 5 and FIG. 6, a closed cross-section 14 extending in the front/rear direction of the vehicle body is formed between the rear floor side part 13 and the rear side frame 11, thereby ensuring the vehicle underbody structure.

Furthermore, as shown in FIG. 6, the outer end portions of the rear floor 3 in the vehicle width direction are sandwiched between the rear floor side parts 13 and the rear side frames 11.

Moreover, as shown in FIG. 4 and FIG. 5, a No. 4 cross member (rear cross member) 15 extending in the vehicle width direction is provided in the intermediate portion, in the front/rear direction, of the rear floor 3 and the rear floor side parts 13.

The No. 4 cross member 15 is provided with a cross member upper part 15U as shown in FIG. 4 and FIG. 5, and a cross member lower part 15L as shown in FIG. 1, FIG. 2 and FIG.

3. As shown in FIG. 4 and FIG. 5, the cross member upper part 15U is joined and fixed to the upper surface of the rear floor 3 and the upper surfaces of the rear floor side parts 13. A closed cross-section 16 is formed between the cross member upper part 15U and the upper surfaces of the elements 3, 13.

As shown in FIG. 1 to FIG. 3, the cross member lower part 15L is joined and fixed to the lower surface of the rear floor 3 and the left and right pair of rear side frames 11 are connected in the vehicle width direction. A closed cross-section (not illustrated) which extends in the vehicle width direction is formed between the cross member lower part 15L and the lower surface of the rear floor 3.

As shown in FIG. 4, a front/rear pair of wheel house reinforcements 17, 18 are joined to the surface of the wheel house 12 on the inner side in the vehicle width direction, in such a manner that inward toppling of the wheel house 12 is prevented by the pair of wheel house reinforcements 17, 18. A front side wheel house reinforcement 17 connects the wheel house 12 and the cross member upper part 15U of the No. 4 cross member 15 in an L shape in front view. A rear side wheel house reinforcement 18 connects the wheel house 12 and a side portion of the rear floor 3 in an L shape in front view.

As shown in FIG. 1 to FIG. 3, rear suspensions 20 for the rear wheels 19 are provided.

The rear suspensions 20 described above are each provided with a trailing arm 21, a front side lower arm 22, a rear side lower arm 24 which also serves as a spring seating for the suspension spring 23 (see FIG. 3), an upper arm, and a sub frame 25, these elements being composed in substantially left/right symmetry.

The sub frame 25 described above is provided with a front side cross member part 26, a rear side cross member part 27 and a left/right pair of side member parts 28. The left and right end sections of the front side cross member part 26 are coupled and fixed to the front sections of the pair of side member parts 28. The left and right end sections of the rear side cross member part 27 are respectively branched in the front/rear direction and coupled and fixed to the intermediate section and the rear section of the pair of side member parts 28. A truss structure is formed by side member part 28 and the front and rear bifurcating sections of the rear side cross member part 27.

Furthermore, rear side vehicle body attachment parts 29 of the left/right side member parts 28 are coupled to the rear side frames 11, and front side vehicle body attachment parts 30 of the left/right side member parts 28 are coupled to the cross member lower part 15L of the No. 4 cross member 15, to the inside of the rear side frames 11 in the vehicle width direction. When a rear collision load is input to the rear side frames 11, the rear collision load is distributed between the rear side frames 11 and vehicle body members apart from the rear side frames 11, such as the cross member lower part 15L, via the side member part 28.

As shown in FIG. 3, the trailing arms 21 described above are respectively provided between the vehicle body side attachment parts (the horizontal part 11B described below) and wheel supports 31 on the rear wheel 19 side. As shown in FIG. 2, the front side lower arms 22 are respectively provided between brackets 32, which are disposed so as to span between the front side cross member parts 26 and the side member parts 28, and the wheel supports 31. The rear side lower arms 24 are respectively provided between the rear side cross member parts 27 and the wheel supports 31. The upper arms are provided between the wheel supports 31, and brackets (not illustrated) which are provided on upper sections of the side member parts 28 in the same position in the front/rear direction as the brackets 32. By means of the rear suspension 20 which is composed in this fashion, the left and right rear wheels 19 are suspended independently.

As shown in FIG. 1, FIG. 2, FIG. 3 and FIG. 6, a fuel tank 33 is provided below the rear floor 3, in the external lower space demarcated by the cross member lower part 2L of the No. 3 cross member 2, the cross member lower part 15L of the No. 4 cross member 15, and the left and right rear side frames 11.

This fuel tank 33 is supported on the vehicle body by means of a left/right pair of tank bands 34.

In this embodiment, the front portions of the tank bands 34 described above are fastened and supported on the cross member lower part 2L of the No. 3 cross member 2 by means of attachment members 35, and the rear portions of the tank bands 34 described above are fastened and supported on the lower part 15L of the No. 4 cross member 15 by means of attachment members 36.

As shown by the side face diagrams in FIG. 4 and FIG. 5, the rear side frames 11 described above each include: in a front portion thereof, a first inclined part 11A having a rearward rising incline; a horizontal part 11B forming a trailing arm attachment part extending horizontally rearwards at the rear side of the first inclined part 11A; and a second inclined part 11C having a rearward rising incline at the rear side of the horizontal part 11B.

Here, the term horizontal includes cases which are completely horizontal and cases which are close to horizontal. Close to horizontal means a range of no more than 5° with respect to a horizontal line.

To compare the first inclined part 11A and the second inclined part 11C of the rear side frame 11, the second inclined part 11C is set so as to have a shallower incline than the first inclined part 11A. In other words, the first inclined part 11A is formed with a relatively steep incline, and the second inclined part 11C is formed with a relatively shallow incline.

Figure 7:
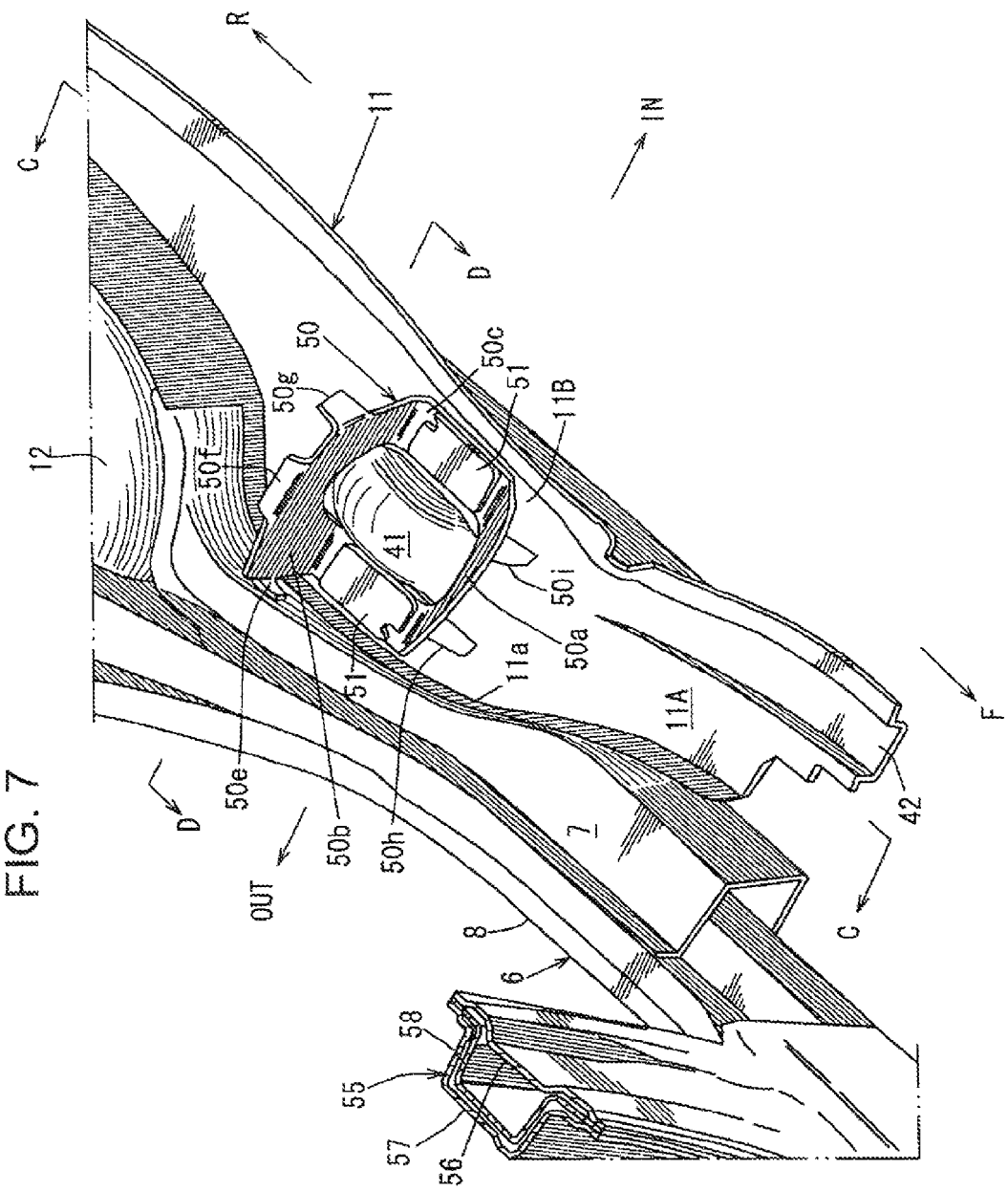
FIG. 7 is a perspective diagram of the principal part showing a state where the rear floor and the rear floor side part have been removed.
Figure 8:
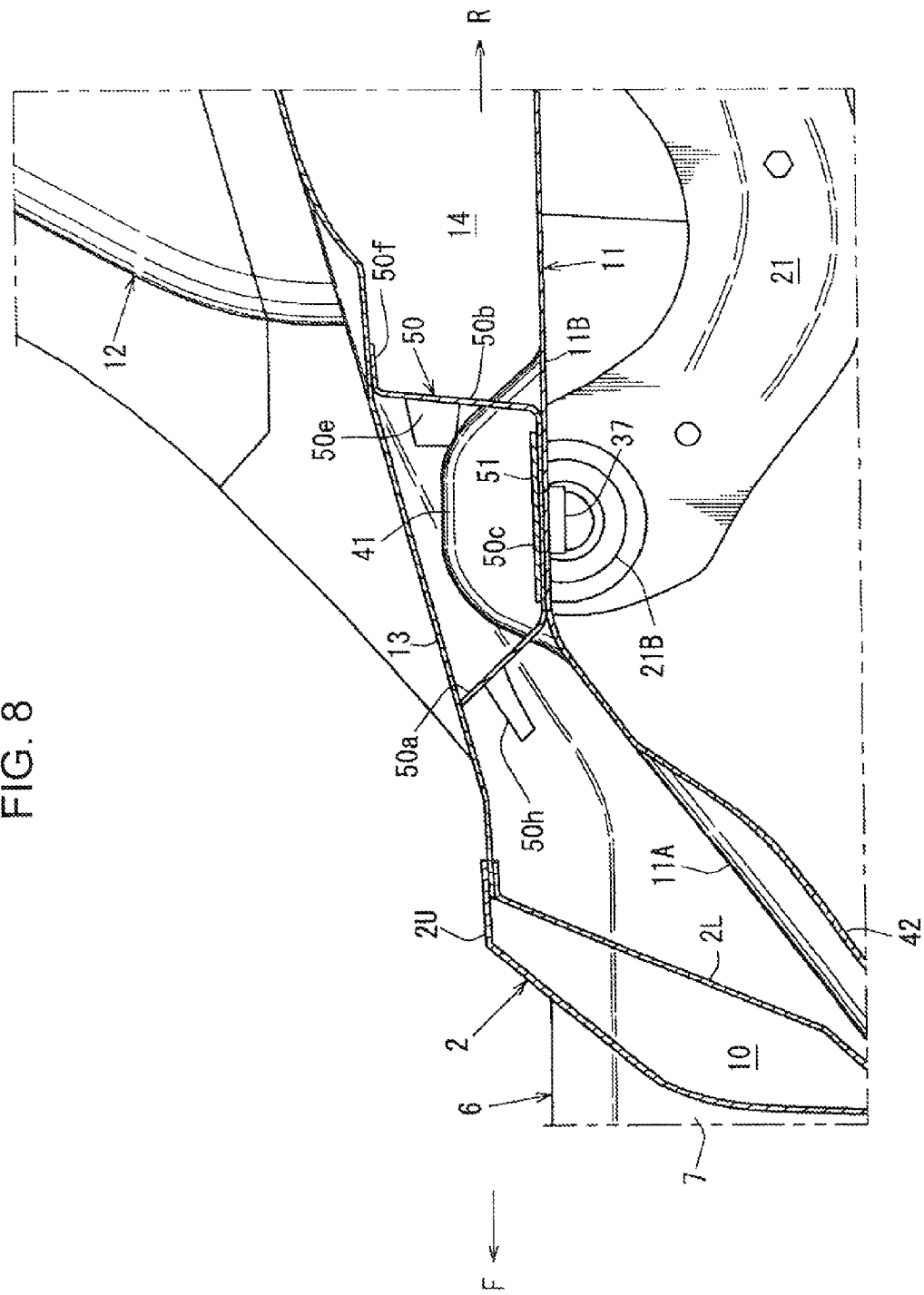
FIG. 8 is a view of the principal part along line C-C in FIG. 7.
Figure 9:
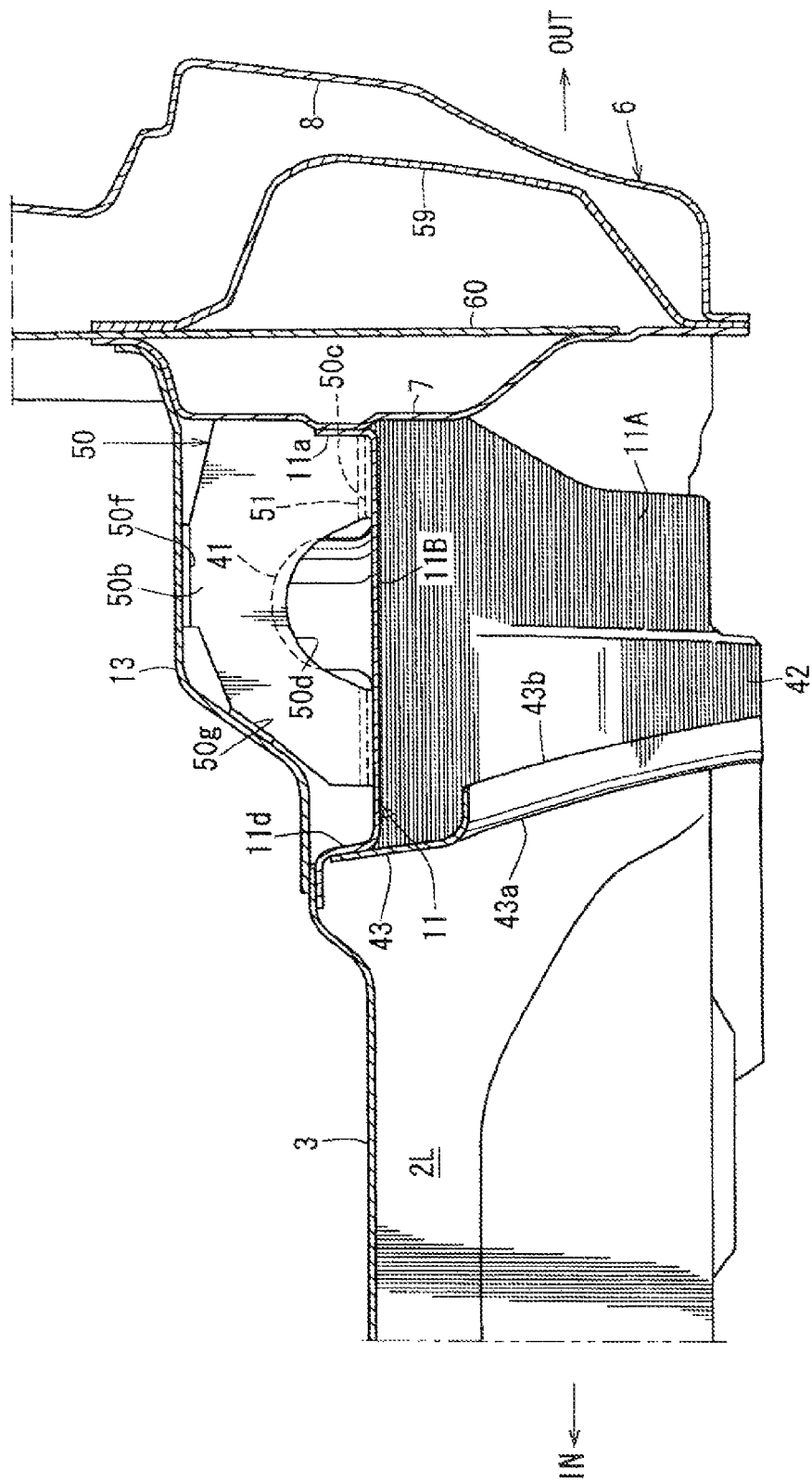
FIG. 9 is a view of the principal part along line D-D in FIG. 7.
Figure 10:
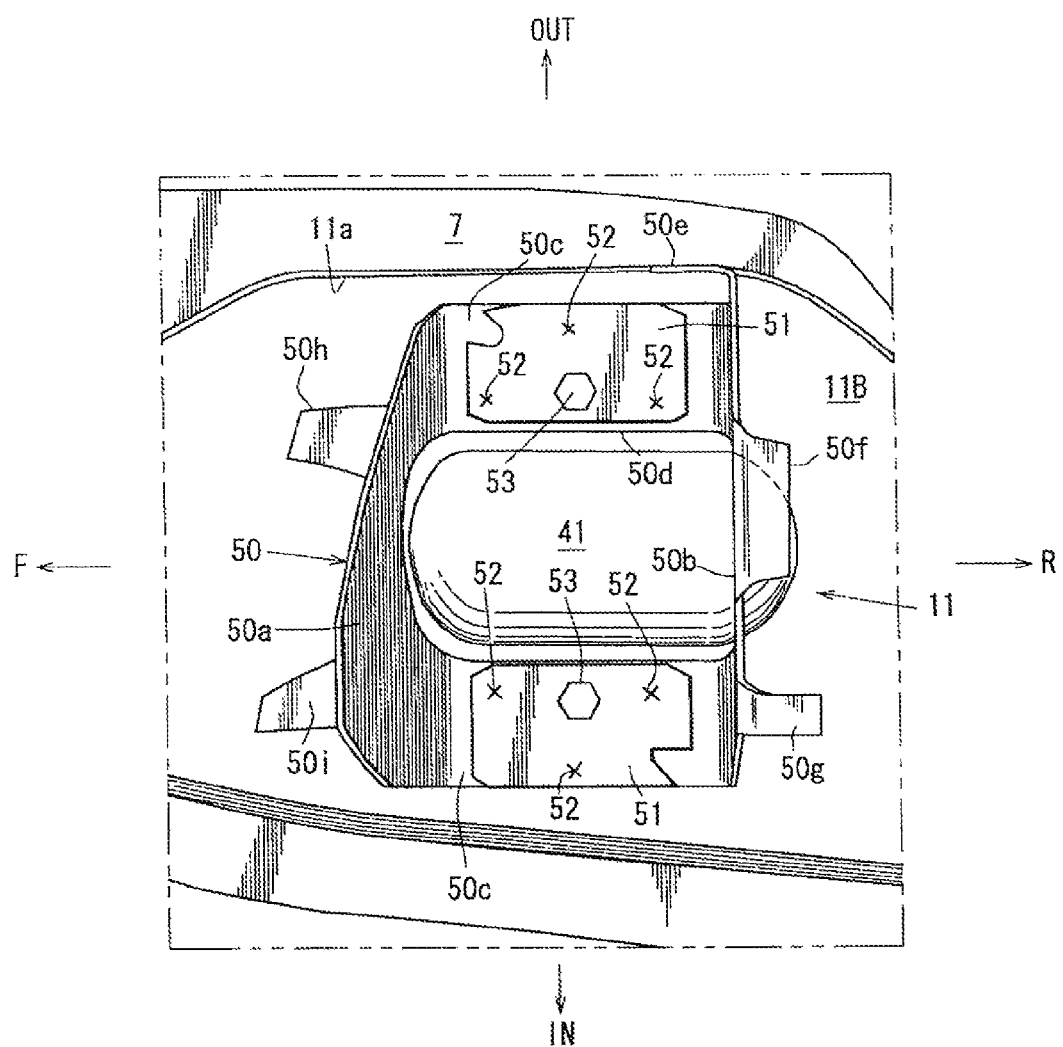
FIG. 10 is a plan diagram of a first protrusion forming portion.

FIG. 7 is a perspective diagram showing the vehicle underbody structure in a state where the rear floor 3 and the rear floor side parts 13 have been removed; FIG. 8 is a view of the principal part along line C-C in FIG. 7 (side face diagram); FIG. 9 is a view of the principal part along line D-D in FIG. 7 (rear face diagram); and FIG. 10 is a plan diagram of the principal part in FIG. 7.

As shown in FIG. 6, FIG. 7, FIG. 8 and FIG. 10, a first protrusion 41 having an upward-convex shape that accommodates at least a portion of the front end section of the trailing arm 21 is formed in an integrated fashion with the rear side frame 11, in the horizontal part 11B which forms a trailing arm attachment part.

This first protrusion 41 has a substantially hat-shaped cross-section in the vehicle width direction as shown in FIG. 6, and is formed with a substantially semi-circular shape in side view, as shown in FIG. 8, in such a manner that a portion of the base end section, in other words, the front end section, of the trailing arm 21, is accommodated inside the first protrusion 41.

Furthermore, as shown in FIG. 2, FIG. 7 and FIG. 9, a downward-convex second protrusion 42 is formed in an integrated fashion with the front section of the first inclined part 11A described above, to the inner side thereof in the vehicle width direction. The second protrusion 42 is formed with a hat-shaped cross-section so as to correspond to the shape of the rear end section of the floor frame 9, and is formed in such a manner that the rear end opening of the floor frame 9 is covered from below by the second protrusion 42.

The first protrusion 41 and the second protrusion 42 are both formed in an integrated fashion with the rear side frame

11. As shown in FIG. 2, FIG. 7 and FIG. 9, the first protrusion 41 and the second protrusion 42 are arranged so as to mutually overlap in the vehicle width direction. By adopting an overlap structure between these elements 41, 42, the rigidity from the first inclined part 11A to the horizontal part 11B is increased, smooth transmission of a load can be achieved in the event of a front collision, and the load of a front collision is transmitted smoothly from the floor frame 9, to the second protrusion 42, the first inclined part 11A, the horizontal part 11B and the second inclined part 11C.

As shown respectively by the side face diagram in FIG. 5, the front face diagram in FIG. 6 and the rear face diagram in FIG. 9, a downwardly erected wall part 43 is provided on the rear side frame 11, to the inside of the horizontal part 11B in the vehicle width direction.

In this embodiment, the rear side frame 11 is formed with a substantially hat-shaped cross-section. As shown in FIG. 6 and FIG. 9, the wall part 43 described above is fixed by welding to a vertical wall 11*d* of the horizontal part 11B situated on the inside thereof in the vehicle width direction.

Furthermore, as shown in FIG. 5, the lower edge part 43*a* of the wall part 43 is formed so as to linearly connect the side face of the second protrusion 42 and the side face of the second inclined part 11C. Consequently, a composition which ensures rigidity from the first inclined part 11A to the horizontal part 11B is achieved.

In other words, since the impact load in the event of a front collision is liable to become concentrated in the first inclined part 11A which is formed with a relatively steep incline, and hence this portion has a high requirement for improved rigidity, then the strength and rigidity from the first inclined part 11A to the horizontal part 11B is raised by linearly connecting the side face of the second protrusion 42 and the side face of the second inclined part 11C, at a lower edge part 43*a* of the wall part 43 described above.

Here, linearly does not only mean a completely linear state, and also includes a partially curved or bent portion, provided that same is within a range that does not impair the beneficial effect of raising the strength and rigidity from the first inclined part 11A to the horizontal part 11B.

As shown in FIG. 6, the fuel tank 33 described above is disposed below the rear floor 3 in the proximity of the wall part 43. As shown in FIG. 6 and FIG. 9, a flange 43*b* is formed in an integrally bent fashion towards the outer side in the vehicle width direction, on the lower edge part 43*a* of the wall part 43. By adopting this structure, as well as improving the rigidity of the wall part 43 itself, while achieving a shape that does not damage the fuel tank 33 in the event of a side collision of the vehicle, further improvement in the rigidity is achieved from the first inclined part 11A to the horizontal part 11B.

Furthermore, as shown by the bottom surface diagram in FIG. 2, the inner surface of the floor frame 9, the second protrusion 42, the wall part 43 and the inner surface of the rear side frame 11 extend in a continuous and stepless fashion in the front/rear direction, and consequently smooth transmission of load can be achieved.

On the other hand, as shown in FIG. 6 and FIG. 8, a bush 21B on the front end section of the trailing arm 21 is supported on a bracket 37 which is bolted onto the lower surface of the horizontal part 11B of the rear side frame 11, and at least a portion of the front end part of the trailing arm 21 is accommodated in the first protrusion 41.

As shown in FIG. 6 and FIG. 8, a bulkhead 50 is provided inside the closed cross-section 14 formed by the rear floor side part 13, which serves as a floor panel, and the rear side frame 11.

Figure 11:
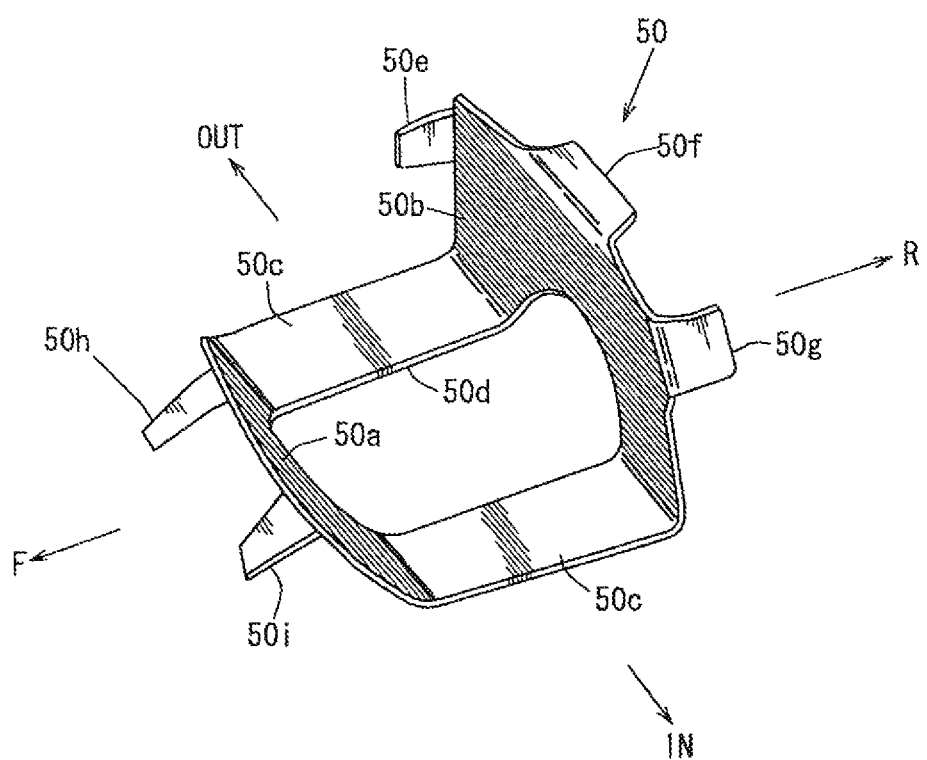
FIG. 11 is a perspective diagram showing only a bulkhead.

As shown by the plan diagram in FIG. 10 and by the perspective diagram in FIG. 11 in which only the bulkhead is illustrated, the bulkhead 50 includes front side and rear side partitioning parts 50*a*, 50*b* which partition the closed cross-section 14 in the front/rear direction of the vehicle body; a joint part 50*c* which is provided on the lower end of the front and rear partitioning parts 50*a*, 50*b* and is joined to the rear side frame 11, and a single opening section 50*d* which is opened in continuous fashion below the joint part 50*c* and the partitioning parts 50*a*, 50*b* so as to allow the first protrusion 41 described above to protrude upwards from the joint part 50*c*, and a plurality of joint flange parts 50*e*, 50*f*, 50*g*, 50*h*, 50*j* for joining and fixing the bulkhead 50 to corresponding portions of the rear floor side part 13 or the rear side frame 11.

The elements 50*a* to 50*c* and 50*e* to 50*j* described above are formed in an integrated fashion. The joint part 50*c* described above is provided in a position that overlaps with the first protrusion 41 in the front/rear direction.

As shown in the plan diagram in FIG. 10, a nut plate 51 is superimposed on the upper surface of the joint part 50*c* of the bulkhead 50. The joint part 50*c* is joined and fixed at spot weld positions 52 indicated by an X symbol in FIG. 10, in a three-layer superimposed state with the rear side frame 11 and the nut plate 51.

In FIG. 10, the reference numeral 53 is a bolt-on part which fastens and fixes the bracket 37. The joint part 50*c* of the bulkhead 50 is joined and fixed to the rear side frame 11 so as to include the bolt-on part 53. In other words, the bulkhead 50 should be as near as possible to the bolt-on part 53 of the bush 21B of the trailing arm 21. Consequently, the rigidity is raised and the load input from the trailing arm 21 can be received in an even more reliable fashion.

Moreover, as shown in FIG. 4, the horizontal part 11B which serves as a trailing arm attachment part, is set to a position higher than the wheel center 54. Consequently, a composition which ensures steering stability is achieved.

In FIG. 4 and FIG. 7, the reference numeral 55 is a center pillar. As shown in FIG. 7, the center pillar 55 is composed by a center pillar inner part 56, a center pillar outer part 57 and a center pillar reinforcement 58. Furthermore, in FIG. 6 and FIG. 9, the reference numeral 59 is a side sill outer reinforcement, and the reference numeral 60 is a rear pillar reinforcement.

In this way, the vehicle underbody structure for a vehicle according to the embodiment described above is a vehicle underbody structure for a vehicle provided with a floor panel 1, a left/right pair of floor frames 9 joined to the lower surface of the floor panel 1 and extending in the front/rear direction of the vehicle body, a left/right pair of rear side frames 11 (rear frames) joined to the lower surface of the rear floor 3 (floor panel) at the rear side of the floor frames 9 and extending in the front/rear direction of the vehicle body, and rear suspensions 20 (suspensions for the rear wheels 19) having trailing arms 21, wherein the rear side frames 11 each include: in a front portion thereof, a first inclined part 11A having a rearward rising incline; a horizontal part 11B (trailing arm attachment part) extending horizontally at the rear side of the first inclined part 11A; and a second inclined part 11C having a rearward rising incline at the rear side of the horizontal part 11B (trailing arm attachment part); an upward-convex first protrusion 41, in which at least a portion of the front end section of the trailing arm 21 is accommodated, being formed in the horizontal part 11B (trailing arm attachment part), an downward-convex second protrusion 42 being formed in a front portion of the first inclined part 11A, and the first protrusion 41 and the second protrusion 42 being arranged so as to mutually overlap in the vehicle width direction (see FIG. 2, FIG. 4 and FIG. 5).

According to this composition, since the horizontal part 11B (trailing arm attachment part) which extends horizontally at the rear side of the first inclined part 11A is provided, and the upward-convex first protrusion 41 which accommodates at least a portion of the front end portion of the trailing arm 21 is formed in the horizontal part 11B (trailing arm attachment part), then it is possible to maintain the height of the horizontal part 11B (trailing arm attachment part), whereby steering stability can be ensured.

Moreover, since the first protrusion 41 and the second protrusion 42 are overlapping in the vehicle width direction, then the rigidity from the first inclined part 11A to the horizontal part 11B (trailing arm attachment part) is raised, smooth transmission of the load can be achieved in the event of a front collision, and the front collision load can be transmitted smoothly from the floor frame 9, to the second protrusion 42, the first inclined part 11A, the horizontal part 11B (trailing arm attachment part) and the second inclined part 11C.

In summary, it is possible both to maintain the height of the horizontal part 11B (trailing arm attachment part), in other words, to ensure good steering stability, while having a lightweight structure, and to ensure smooth transmission of the load in the event of a front collision by ensuring and improving rigidity from the first inclined part 11A to the horizontal part 11B (trailing arm attachment part).

Moreover, a downwardly erected wall part 43 is provided to the inside of the horizontal part 11B (trailing arm attachment part) in the vehicle width direction, and a lower edge part 43a of the wall part 43 is formed so as to connect, in linear fashion, the side face of the second protrusion 42 and the side face of the second inclined part 11C (see FIG. 5 and FIG. 6).

By adopting this composition, since the side face of the second protrusion 42 and the side face of the second inclined part 11C are connected linearly by the lower edge part 43a of the wall part 43, then the rigidity from the first inclined part 11A to the horizontal part 11B (trailing arm attachment part) can be improved further.

Furthermore, a fuel tank 33 is provided in the proximity of the wall part 43 below the rear floor 3 (floor panel), and a flange 43b is formed towards the outer side in the vehicle width direction, on the lower edge part 43a of the wall part 43 (see FIG. 6).

By means of this composition, a flange 43b facing outwards in the vehicle width direction is formed on the lower edge part 43a of the wall part 43, and therefore it is possible to further improve, in addition to the rigidity of the wall part 43, the rigidity from the first inclined part 11A to the horizontal part 11B (trailing arm attachment part), while adopting a shape which does not damage the fuel tank 33 in the event of a side collision of the vehicle.

In addition to this, the second protrusion 42 is formed so as to cover the rear end opening section of the floor frame 9, from below (see FIG. 2 and FIG. 5).

According to this composition, since the rear end opening section of the floor frame 9 is covered from below by the second protrusion 42, then it is possible to prevent infiltration of foreign matter, such as water and mud, etc. Furthermore, according to this composition, the cross-section is continuous from the rear end section of the floor frame 9 to the front section of the second protrusion 42, and consequently, transmission of load becomes even better and further improvements in resistance to collisions can be achieved.

Moreover, a bulkhead 50 is provided inside the closed cross-section 14 which is formed by the rear floor side part 13 (floor panel) and the rear side frame 11 (rear frame). This bulkhead 50 includes partitioning parts 50a, 50b which partition the closed cross-section 14 in the front/rear direction of the vehicle body, and a joint part 50c which is provided at the lower ends of the partitioning parts 50a, 50b and which is joined to the rear side frame 11 (rear frame), the joint part 50c being provided at a position overlapping with the first protrusion 41 in the front/rear direction (see FIG. 6 and FIG. 8).

According to this composition, since a bulkhead 50 including the partitioning parts 50a, 50b and the joint part 50c is provided, and the joint part 50c is made to overlap with the first protrusion 41 in the front/rear direction, then it is possible to achieve improved rigidity of the horizontal part 11B (trailing arm attachment part) on which the first protrusion 41 is formed, and hence the rigidity from the first inclined part 11A to the horizontal part 11B (trailing arm attachment part) can be further improved.

In the embodiment described above, a front/rear pair of the partitioning parts 50a, 50b were provided, but it is also possible to provide either one of the partitioning parts only.

In respect of the correspondence between the composition of the invention and the embodiment described above, the floor panel of the invention includes the floor panel 1, the rear floor 3 and the rear floor side parts 13 of the embodiment, and similarly, the rear frame corresponds to the rear side frame 11, the rear wheel suspension corresponds to the rear suspension 20, and the trailing arm attachment part corresponds to the horizontal part 11B.

The present invention as described above can be summarized as follows.

More specifically, the vehicle underbody structure for a vehicle according to one aspect of the present invention is a vehicle underbody structure for a vehicle, including: a floor panel; a left and right pair of floor frames which are joined to a lower surface of the floor panel and extend in a front/rear direction of the vehicle body; a left and right pair of rear frames which are joined to the lower surface of the floor panel at the rear side of the floor frames and extend in the front/rear direction of the vehicle body; and a rear wheel suspension having a trailing arm, wherein the rear frames each include: a first inclined part having a rearward rising incline; a trailing arm attachment part extending horizontally at the rear side of the first inclined part; and a second inclined part having a rearward rising incline at the rear side of the trailing arm attachment part, an upward-convex first protrusion, in which at least a portion of a front end section of the trailing arm is accommodated, is formed in the trailing arm attachment part, a downward-convex second protrusion is formed in a front section of the first inclined part, and the first protrusion and the second protrusion are disposed so as to mutually overlap in a vehicle width direction.

According to this composition, since the trailing arm attachment part which extends horizontally at the rear side of the first inclined part is provided, and the upward-convex first protrusion which accommodates at least a portion of the front end portion of the trailing arm is formed in the trailing arm attachment part, then it is possible to maintain the height of the trailing arm attachment part, whereby steering stability can be ensured.

Moreover, since the first protrusion and the second protrusion are overlapping in the vehicle width direction, then the rigidity from the first inclined part to the trailing arm attachment part is raised, smooth transmission of the load can be achieved in the event of a front collision, and the front collision load can be transmitted smoothly from the floor frame, to the second protrusion, the first inclined part, the trailing arm attachment part and the second inclined part.

In summary, a beneficial effect is obtained in that it is possible both to maintain the height of the trailing arm attachment part, (in other words, ensure good steering stability,) and ensure smooth transmission of load in the event of a front collision by ensuring and improving the rigidity in the trailing arm attachment part from the first inclined part, while having a light-weight structure.

In one embodiment of this invention, a downwardly erected wall part is provided on an inner side of the trailing arm attachment part in the vehicle width direction, and a lower edge section of the wall part is formed so as to linearly connect a side face of the second protrusion and a side face of the second inclined part.

According to the composition described above, since the side face of the second protrusion and the side face of the second inclined part are connected linearly by the lower edge section of the wall part, then the rigidity from the first inclined part to the trailing arm attachment part can be further improved.

In one embodiment of this invention, a fuel tank is provided in proximity to the wall part, below the floor panel, and a flange is formed towards the outer side in the vehicle width direction, in the lower edge section of the wall part.

According to the composition described above, since a flange facing outwards in the vehicle width direction is formed in the lower edge section of the wall part, then it is possible to further improve the rigidity from the first inclined part to the trailing arm attachment part, as well as the rigidity of the wall part, while having a shape that does not damage the fuel tank in the event of a side collision of the vehicle.

In one embodiment of this invention, the second protrusion is formed so as to cover a rear end opening section of the floor frame, from below.

According to the composition described above, since the rear end opening section of the floor frame is covered from below by the second protrusion, then infiltration of foreign matter, such as water or dirt, can be prevented, the cross-section is continuous from the rear end section of the floor frame to the second protrusion, whereby transmission of load becomes even better and further improvements can be achieved in resistance to collisions.

In one embodiment of this invention, a bulkhead is provided inside a closed cross-section formed by the floor panel and the rear frame, the bulkhead includes: a partitioning part which partitions the closed cross-section in the front/rear direction of the vehicle body; and a joint part which is provided on a lower end of the partitioning part and is joined to the rear frame, the joint part being provided at a position overlapping with the first protrusion in the front/rear direction.

According to the composition described above, since a bulk head provided with a partitioning part and a joint part is provided, and the joint part overlaps with the first protrusion in the front/rear direction, then it is possible to improve the rigidity of the trailing arm attachment part on which the first protrusion is formed, and hence the rigidity from the first inclined part to the trailing arm attachment part is further improved.

This application is based on Japanese Patent Application No. 2011-277784 filed on 20 Dec. 2011, the contents of which are incorporated into the present application.

In order to represent the present invention, the invention has been described appropriately and sufficiently above by embodiments with reference to drawings, but it is to be understood that a person skilled in the art could easily change and/or modify the embodiments described above. Consequently, provided that changes or modifications made by a person skilled in the art do not depart from the scope of the claims indicated herein, such changes or modifications are interpreted as being encompassed within the scope of the claims.

INDUSTRIAL APPLICABILITY

As described above, the present invention is useful for a vehicle underbody structure for a vehicle, including: a floor panel; a left and right pair of floor frames which are joined to the lower surface of the floor panel and extend in the front/rear direction of the vehicle body; a left and right pair of rear frames which are joined to the lower surface of the floor panel at the rear side of the floor frames and extend in the front/rear direction of the vehicle body; and a rear wheel suspension having a trailing arm.

The invention claimed is:

1. A vehicle underbody structure for a vehicle, comprising:
a floor panel;
a left/right pair of floor frames joined to a lower surface of the floor panel and extending in a front/rear direction of a vehicle body;
a left/right pair of rear frames joined to the lower surface of the floor panel at the rear side of the floor frames and extending in the front/rear direction of the vehicle body; and
a rear wheel suspension having a trailing arm,
wherein the rear frames each include:
a first inclined part having a rearward rising incline;
a trailing arm attachment part extending horizontally at the rear side of the first inclined part; and
a second inclined part having a rearward rising incline at the rear side of the trailing arm attachment part,
an upward-convex first protrusion, in which at least a portion of a front end section of the trailing arm is accommodated, is formed in the trailing arm attachment part,
a downward-convex second protrusion is formed in a front section of the first inclined part, and
the first protrusion and the second protrusion are disposed so as to mutually overlap in a vehicle width direction.

2. The vehicle underbody structure for a vehicle according to claim 1,
wherein a downwardly erected wall part is provided on an inner side of the trailing arm attachment part in the vehicle width direction, and
a lower edge section of the wall part is formed so as to linearly connect a side face of the second protrusion and a side face of the second inclined part.

3. The vehicle underbody structure for a vehicle according to claim 2,
wherein a fuel tank is provided in proximity to the wall part, below the floor panel, and
a flange is formed towards the outer side in the vehicle width direction, in the lower edge section of the wall part.

4. The vehicle underbody structure for a vehicle according to claim 3, wherein the second protrusion is formed so as to cover a rear end opening section of the floor frame, from below.

5. The vehicle underbody structure for a vehicle according to claim 4,
wherein a bulkhead is provided inside a closed cross-section formed by the floor panel and the rear frame,
the bulkhead includes:

a partitioning part which partitions the closed cross-section in the front/rear direction of the vehicle body; and a joint part which is provided on a lower end of the partitioning part and is joined to the rear frame, the joint part being provided at a position overlapping with the first protrusion in the front/rear direction.

6. The vehicle underbody structure for a vehicle according to claim 3, wherein a bulkhead is provided inside a closed cross-section formed by the floor panel and the rear frame, the bulkhead includes:

a partitioning part which partitions the closed cross-section in the front/rear direction of the vehicle body; and a joint part which is provided on a lower end of the partitioning part and is joined to the rear frame, the joint part being provided at a position overlapping with the first protrusion in the front/rear direction.

7. The vehicle underbody structure for a vehicle according to claim 2, wherein the second protrusion is formed so as to cover a rear end opening section of the floor frame, from below.

8. The vehicle underbody structure for a vehicle according to claim 7, wherein a bulkhead is provided inside a closed cross-section formed by the floor panel and the rear frame, the bulkhead includes:

a partitioning part which partitions the closed cross-section in the front/rear direction of the vehicle body; and a joint part which is provided on a lower end of the partitioning part and is joined to the rear frame, the joint part being provided at a position overlapping with the first protrusion in the front/rear direction.

9. The vehicle underbody structure for a vehicle according to claim 2, wherein a bulkhead is provided inside a closed cross-section formed by the floor panel and the rear frame, the bulkhead includes:

a partitioning part which partitions the closed cross-section in the front/rear direction of the vehicle body; and a joint part which is provided on a lower end of the partitioning part and is joined to the rear frame, the joint part being provided at a position overlapping with the first protrusion in the front/rear direction.

10. The vehicle underbody structure for a vehicle according to claim 1, wherein the second protrusion is formed so as to cover a rear end opening section of the floor frame, from below.

11. The vehicle underbody structure for a vehicle according to claim 10, wherein a bulkhead is provided inside a closed cross-section formed by the floor panel and the rear frame, the bulkhead includes:

a partitioning part which partitions the closed cross-section in the front/rear direction of the vehicle body; and a joint part which is provided on a lower end of the partitioning part and is joined to the rear frame, the joint part being provided at a position overlapping with the first protrusion in the front/rear direction.

12. The vehicle underbody structure for a vehicle according to claim 1, wherein a bulkhead is provided inside a closed cross-section formed by the floor panel and the rear frame, the bulkhead includes:

a partitioning part which partitions the closed cross-section in the front/rear direction of the vehicle body; and a joint part which is provided on a lower end of the partitioning part and is joined to the rear frame, the joint part being provided at a position overlapping with the first protrusion in the front/rear direction.

\* \* \* \* \*